US007152988B2

(12) United States Patent
Hung (10) Patent No.: US 7,152,988 B2
(45) Date of Patent: Dec. 26, 2006

(54) DIRECT POINT-LIGHT TYPE BACKLIGHT MODULE AND LIQUID CRYSTAL DISPLAY USING THE SAME

(75) Inventor: Chen-Pin Hung, Tainan County (TW)

(73) Assignee: Chi Mei Optoelectronics Corp., Tainan County (TW)

( * ) Notice: Subject to any disclaimer, the term of this patent is extended or adjusted under 35 U.S.C. 154(b) by 130 days.

(21) Appl. No.: 11/090,646

(22) Filed: Mar. 25, 2005

(65) Prior Publication Data
US 2005/0219836 A1 Oct. 6, 2005

(30) Foreign Application Priority Data
Mar. 30, 2004 (TW) ................ 93108762 A (51) Int. Cl.
*G09F 13/04* (2006.01)
(52) U.S. Cl. .................. 362/97; 362/241; 362/246; 362/330; 349/64
(58) Field of Classification Search .............. 362/97, 362/241, 246, 612, 617–619, 330; 349/64
See application file for complete search history.

(56) References Cited

U.S. PATENT DOCUMENTS 5,886,759 A * 3/1999 Mashino et al. ............. 349/64
6,099,134 A * 8/2000 Taniguchi et al. ........... 362/618
7,014,351 B1 * 3/2006 Leu et al. ................... 362/619

* cited by examiner

*Primary Examiner*—Stephen F Husar
(74) *Attorney, Agent, or Firm*—Thomas, Kayden, Horstemeyer & Risley (57) ABSTRACT

A liquid crystal display device comprises a liquid crystal panel having two substrates and a liquid crystal material sealed therebetween; a backlight module disposed under the liquid crystal panel; and a display case for housing the liquid crystal panel and the backlight module. The backlight module is a direct point-light type and comprises a plurality of point light sources, a reflector, a diffuser and a plurality of optical sheets. The reflector has a plurality of openings respectively positioned in relation to the point light sources such that the light provided by the point light sources can pass through the openings of the reflector and then reach the diffuser. The diffuser has a plurality of dot elements which are formed thereon and compose at least one of radially variable dot specific pattern. The radially variable dot specific pattern defines a center portion, and at least one of the point light sources is aligned relative to the center portion of the radially random dot specific pattern.

27 Claims, 9 Drawing Sheets

FIG. 10b

DIRECT POINT-LIGHT TYPE BACKLIGHT MODULE AND LIQUID CRYSTAL DISPLAY USING THE SAME

CROSS REFERENCE TO RELATED APPLICATION

This application claims the priority benefit of Taiwan Patent Application Serial Number 093108762, filed Mar. 30, 2004, the full disclosure of which is incorporated herein by reference.

TECHNICAL FIELD

This disclosure generally relates to a point-light type backlight module, and more particularly to a direct point-light type backlight module for liquid crystal displays.

BACKGROUND

Figure 1:
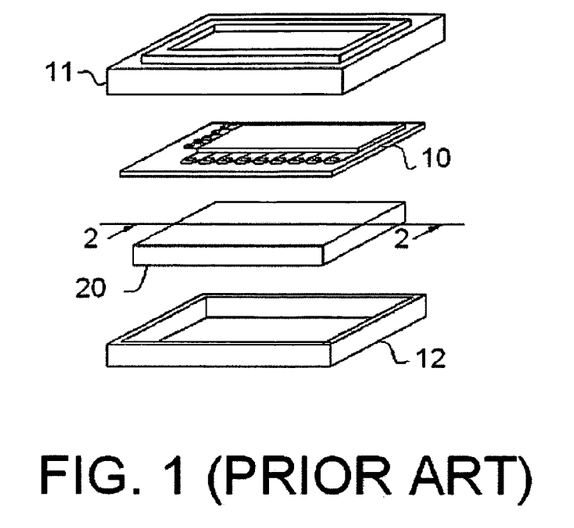
FIG. 1 shows an exploded view of a conventional liquid crystal display device.

FIG. 1 depicts the structure of a conventional liquid crystal display device. Generally, the liquid crystal display device includes a liquid crystal panel 10 which has two substrates and a liquid crystal material sealed therebetween, a backlight module 20 disposed under the liquid crystal panel 10, and cases 11 and 12.

The backlight module 20 is utilized to distribute the light from a light source uniformly over the surface of the liquid crystal panel 10. There are several kinds of backlight modules 20 such as a direct backlight type (or direct type) and an edge light type.

Figure 2:
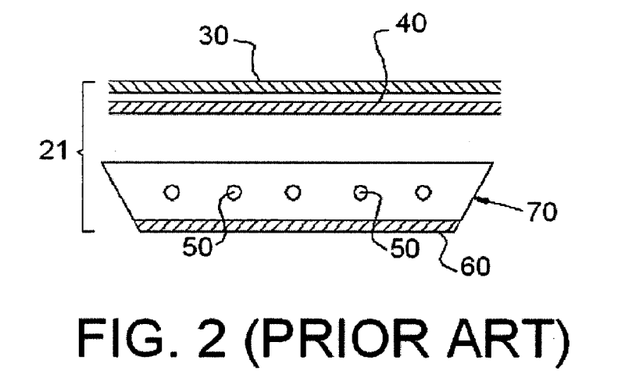
FIG. 2 shows a sectional view of a conventional direct type backlight module.

FIG. 2, which is a cross-sectional view along line 2—2 of FIG. 1, depicts a direct type backlight module 21. The direct type backlight module 21 includes a housing 70 having a bottom surface 71. A reflective sheet 60 is disposed on the bottom surface 71 of the housing 70. Lamps 50, such as fluorescence cathode tubes, are disposed proximal to the bottom portion of the housing 70. A diffusing sheet 40 is disposed above the lamps 50. A prism sheet 30 is disposed above the diffusing sheet 40.

Figure 3:
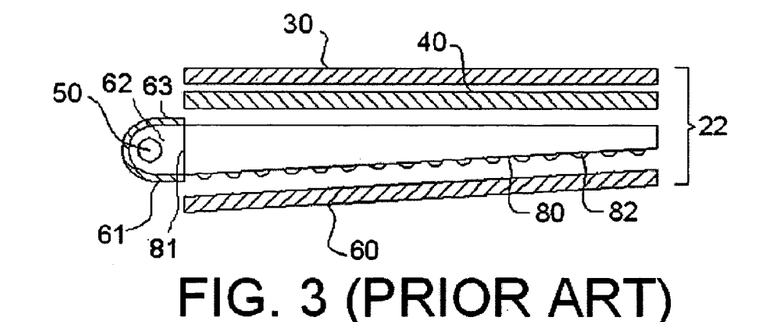
FIG. 3 shows a sectional view of a conventional edge light type backlight module.

FIG. 3, which is a cross-sectional view along line 2—2 of FIG. 1, depicts a edge light type backlight module 22. The edge light type backlight module 22 includes a light guide 80 having an edge 81. A lamp 50 is attached to the edge 81 of the light guide 80. In other embodiments, several lamps are attached to edges of the light guide 80. The edge light type backlight module 22 includes a reflector 61 having a generally U-shaped hollow interior 62 with an opening 63. The lamp 50 is disposed in the U-shaped interior 62. The opening 63 of the reflector 61 is disposed at the edge 81 of the light guide 80. A reflecting sheet 60 is disposed below the light guide 80, and a diffusing sheet 40 is disposed above the light guide 80. A prism sheet 30 is disposed above the diffusing sheet 40. Because the lamp 50 is disposed at the edge of the light guide 80, the thickness of the LCD can be relatively decreased.

Figure 4:
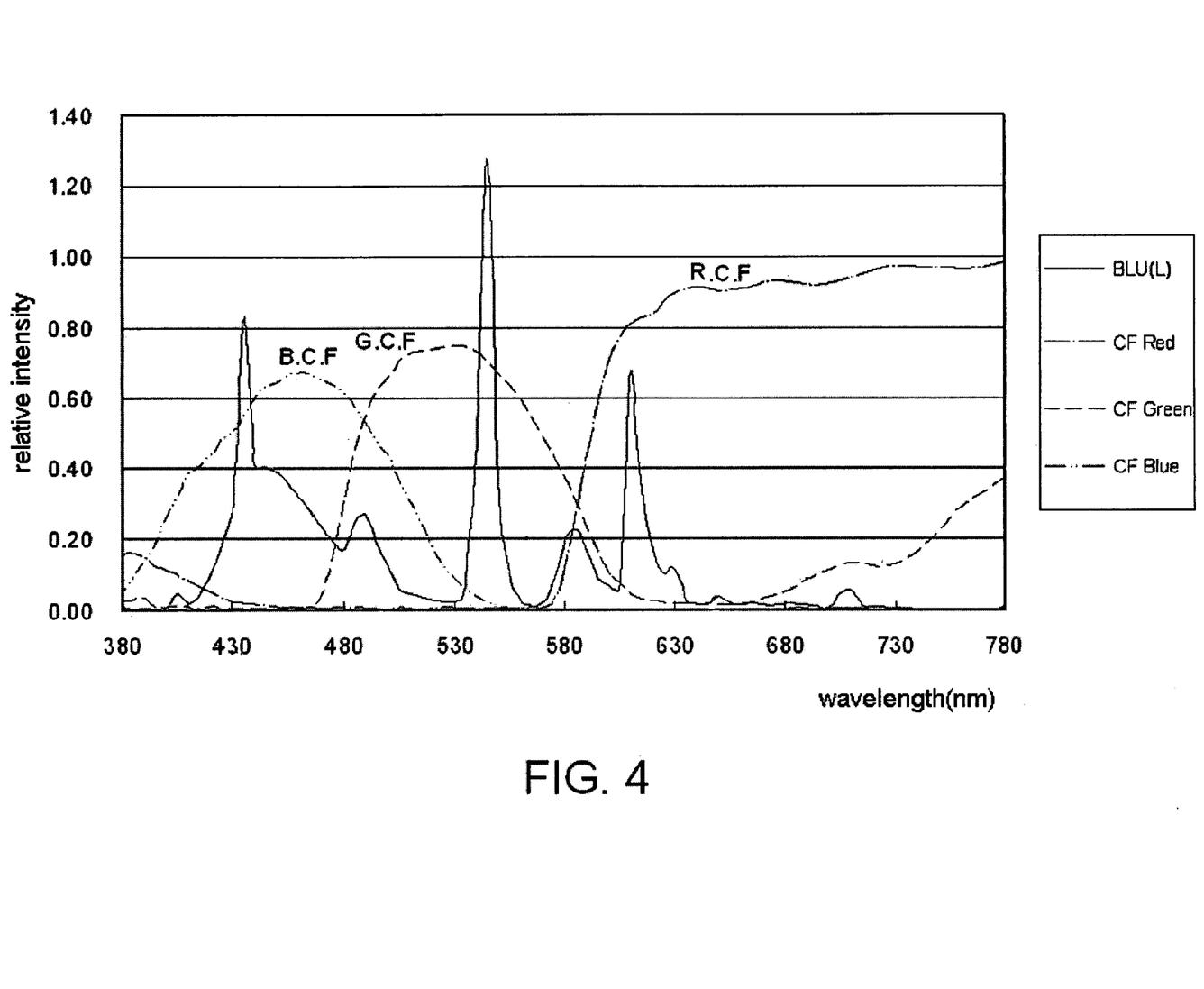
FIG. 4 shows a spectrum of a conventional direct CCFL type backlight module.

Compared with the edge light type backlight module, the direct type backlight module can provide higher brightness since the light therefrom can directly enter the display area of a display panel without light loss caused by a light guide. Further, the manufacturing cost can be reduced since a light guide is not used. However, the conventional direct type backlight module using cold cathode fluorescent lamps (CCFL) still has following disadvantages:

1. Poor color saturation: the spectrums of red (R), green (G) and blue (B) colors are so wide that the current color filters cannot filter out pure colored lights (referring to FIG. 4), and the color saturation is around 72 percent of the color gamma defined by the National Television System Committee (NTSC) standard.
2. Slow response time: the response time is confined to the luminescence mechanism of the lamp and therefore greater than several milliseconds;
3. Being greatly affected by ambient temperature: the cold cathode fluorescent lamp (CCFL) has highest luminescence efficiency only under a specific temperature, and its luminescence efficiency is greatly affected by ambient temperature;
4. High driving voltage: the driving voltage of the cold cathode fluorescent lamp (CCFL) is greater than 1000V; and
5. Being environmentally unfriendly: the cold cathode fluorescent lamp (CCFL) contains mercury (Hg).

Figure 5:
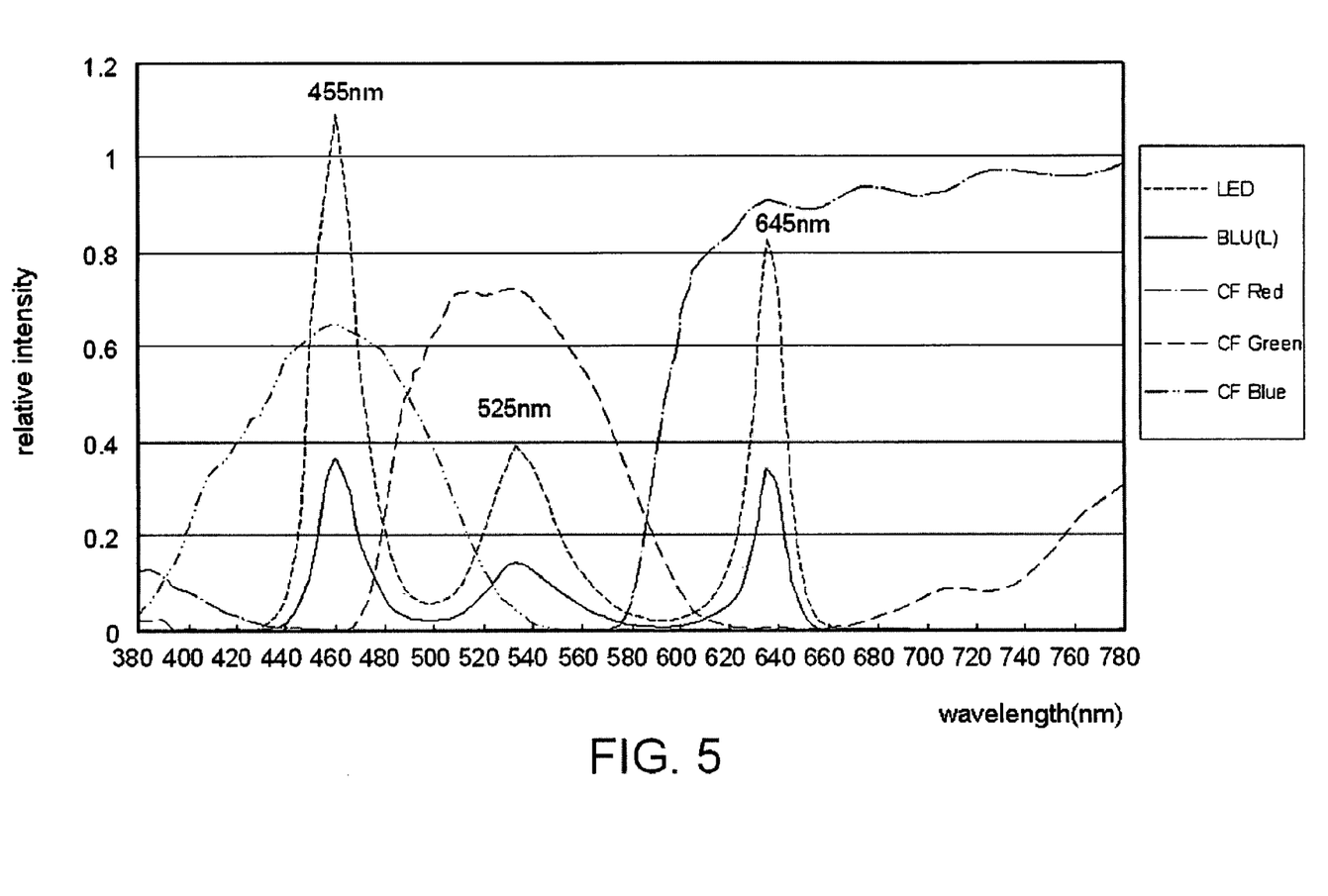
FIG. 5 shows a spectrum of a direct LED type backlight module.

Therefore, manufacturers have developed a direct light-emitting-diode (LED) type backlight module for solving the above problems. Compared with the direct CCFL type backlight module, the direct LED type backlight module has following advantages:

1. Excellent color saturation: the spectrums of red (R), green (G) and blue (B) colors are so centralized that the current color filters can easily filter out pure colored lights (referring to FIG. 5), and the color saturation is almost 100 percent of the color gamma defined by the NTSC standard;
2. Fast response time: the response time is greater than several nanoseconds;
3. Being not affected by ambient temperature;
4. Low driving voltage: the driving voltage of the red LED is about 2V to 3V and the driving voltages of the blue and green LEDs are about 3V to 5V; and
5. Being environmentally friendly: the LED does not contain mercury (Hg).

Accordingly, the direct LED type backlight module has been the main trend for LCD device.

SUMMARY

Embodiments of the present disclosure provide a point light backlight module for a LCD display. Briefly described, in architecture, one embodiment of the point light backlight module among others, can be implemented as follows: a point light source that emits light; and a diffuser that receives light directly from the light source. The diffuser has plurality of dot elements that define a first dot specific pattern centered upon a center point. The dot specific pattern has a local maximum dot element density proximal to the center point, and the dot element density radially diminishes therefrom.

Embodiment of the present disclosure can also be viewed as providing methods for manufacturing an LCD display with a point light backlight module. In this regard, one embodiment of such a method, among others, can be broadly summarized by the following steps: forming a plurality of point light sources; forming a reflector having a plurality of openings formed thereon, and each opening positioned in relation to each point light source; forming a diffuser having a plurality of dot elements which are formed thereon and compose a plurality of radially variable dot specific patterns, wherein each pattern defines a center portion thereof and at least one of the point light sources is corresponding to the center portion of one of the radially variable dot specific patterns.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Objects, advantages, and novel features of the present disclosure will become more apparent from the following detailed description when taken in conjunction with the accompanying drawings.

DETAILED DESCRIPTION

In one embodiment of the disclosure, a liquid crystal display (LCD) device including a liquid crystal panel which has two substrates and a liquid crystal material sealed therebetween, a backlight module disposed under the liquid crystal panel, and a display case for housing the liquid crystal panel and the backlight module. The backlight module is a direct point-light type backlight module used for replacing the conventional direct CCFL type backlight module.

A direct point-light type backlight module comprises a plurality of point light sources; a reflector having a plurality of openings respectively positioned in relation to the point light sources; and a diffuser having a plurality of dot elements that are formed thereon. The dot elements are described in greater detail hereinbelow. In one embodiment, the dot elements define a plurality of radially variable dot specific patterns, wherein each pattern defines a center portion, and at least one of the point light sources is aligned relative to the center portion of one of the radially variable dot specific patterns.

In one embodiment, the distribution of the dot elements close to the point light source is dense or the diameter of the dot elements close to the same is large; the distribution of the dot elements far from the point light source is sparse or the diameter of the dot elements far from the same is small. In other words, the density of the dot elements is a function of the distance from the point light source.

Figure 6:
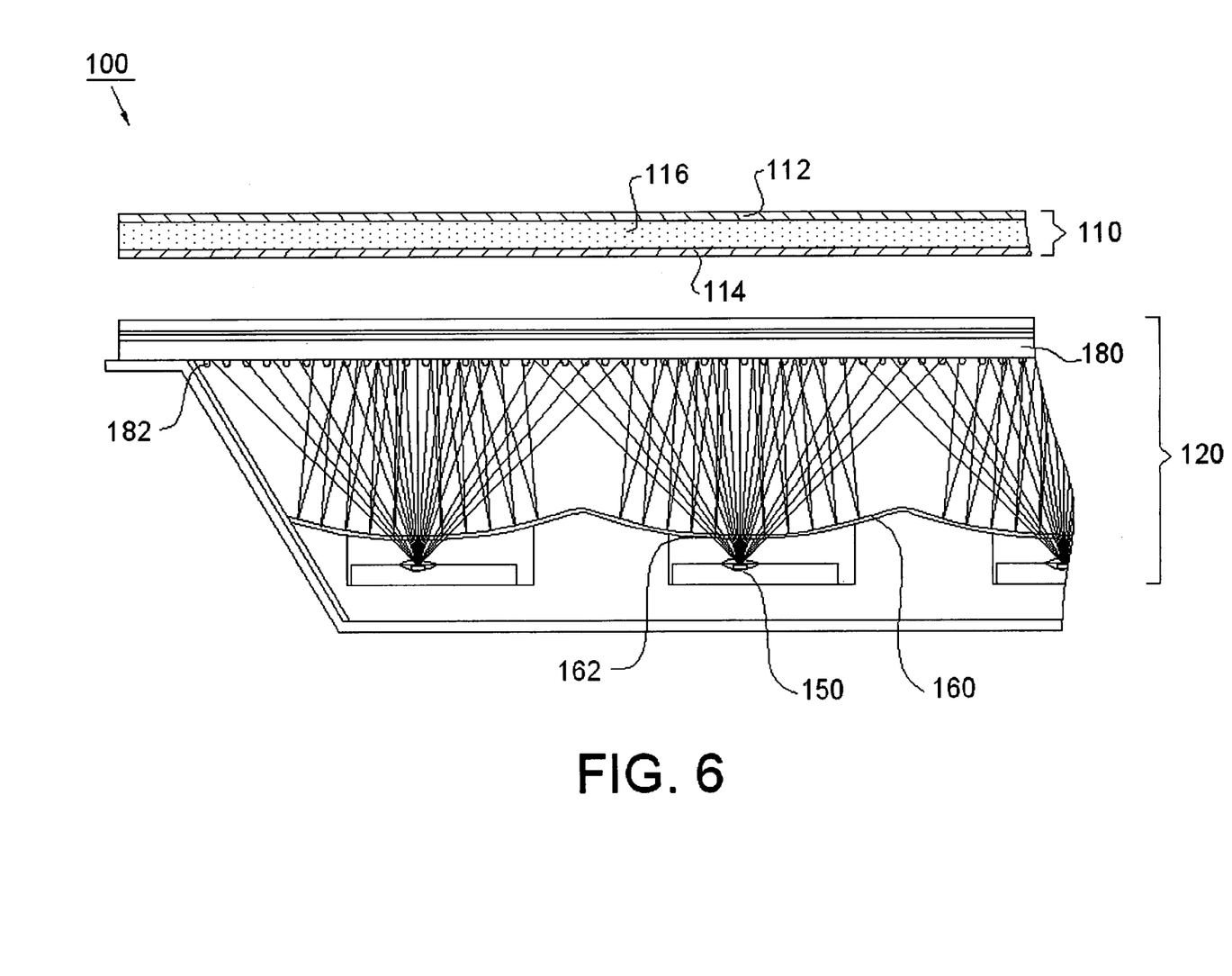
FIG. 6 shows a partially schematic view of a liquid crystal display device having a direct point-light type backlight module according to one embodiment of the present disclosure.

Now referring to FIG. 6, a partially schematic view of a liquid crystal display (LCD) device 100 having a backlight module according to one embodiment of the present disclosure is shown. The LCD device 100 includes a liquid crystal panel 110 and a backlight module 120. The liquid crystal panel 110 has two substrates 112, 114 and a liquid crystal material 116 sealed therebetween.

The backlight module 120 is a direct point-light type backlight module. The backlight module 120 evenly emits light to a display area of the liquid crystal panel 110 and thus illuminating the liquid crystal panel 110. The backlight module 120 comprises a plurality of point light sources 150, a reflector 160, a diffuser 180.

The reflector 160 has a plurality of openings 162, and the openings 162 are respectively positioned in relation to the point light sources 150 such that the light provided by the point light sources 150 can pass through the openings 162 of the reflector 160 and then reach the diffuser 180. When the light reaches the diffuser 180, a portion of the incident light is transmitted through the diffuser 180 and a portion of the incident light is reflected from the diffuser 180 to the reflector 160 where the light is then again reflected back to the diffuser 180. According to different types of point light sources 150, the reflector 160 can be disposed above, below or at the same level as the point light sources 150. Moreover the reflector 160 is not forming a plurality of openings 162, and also can be a continous reflecting surface or forming a plurality of high transmissivity areas are respectively positioned in relation to the point light sources 150. In a word, a reflector 160 reflects lights that are supplied by the light sources 150.

As will be explained in detail hereinbelow, a plurality of dot elements (see FIG. 7) are disposed on the diffuser 180. The dot elements reflect a portion of the incident light back towards the reflector 160. By reflecting a portion of the light from the diffuser 180 to the reflector 160 and then back to the diffuser 180, the light that is transmitted through the diffuser 180 to the display area of the LCD has more uniformity in its intensity than if the light had not been reflected between the diffuser 180 and reflector 160.

Figure 7:
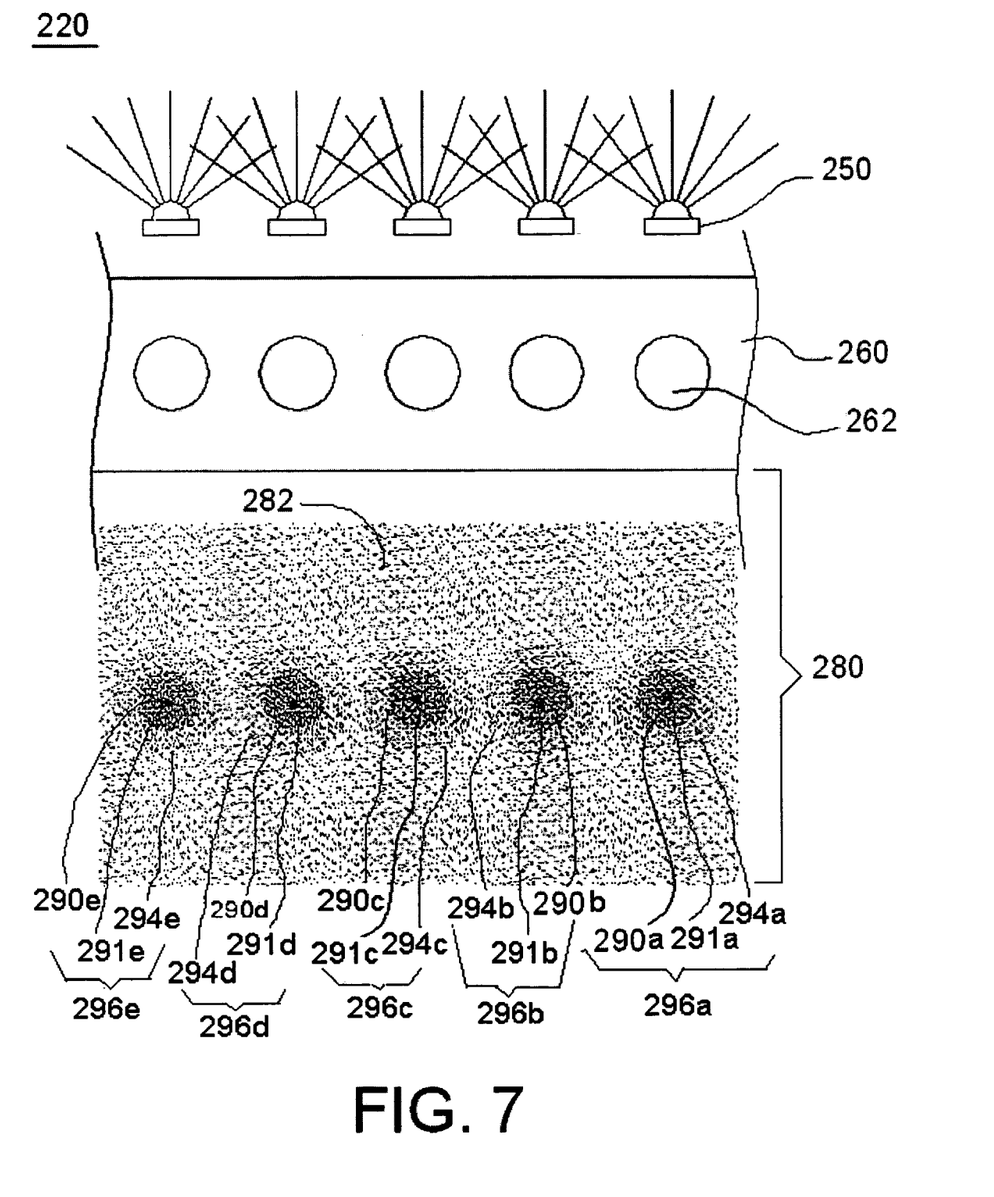
FIG. 7 shows a schematic view of a direct point-light type backlight module according to one embodiment of the present disclosure.

FIG. 7 shows a schematic view of a direct point-light type backlight module 220 according to one embodiment of the present disclosure. The direct point-light type backlight module 220 comprises a plurality of point light sources 250, a reflector 260 having a plurality of opening 262 formed thereon, and a diffuser 280 having a plurality of dot elements 282 which are formed thereon. The plurality of dot elements 282 are disposed on the diffuser in a predetermined manner or in a random manner. For the purposes of this disclosure dot element density is defined as the reflective area within a unit area divided by the unit area. Thus, if the dots reflectors 282 are each of uniform size, eg., X millimeter 2 (mm 2), and a unit area is defined as Y mm 2, then the dot element density for a given unit area is (nX/Y), where n is the number of dot elements in the unit area. Of course, the dot element density is a function of both the number of dot elements 282 per unit area and the size of the dot elements.

In FIG. 7., a diffuser 280 having a plurality of dot elements 282 which are formed thereon and compose a radially variable dot specific pattern 296 (296a–296e), the radially variable dot specific pattern 296 defines a center portion 290 (290a–290e) and a peripheral portion 294 (294a–294e). Regarding to the radially variable dot specific pattern 296, dot element density is non-uniform. Points 291a–291e are local centers about which a region of locally high dot element density, center portion 290, is disposed. Extending radially from the points 291, outside of the center portion 290, is a region of locally intermediate dot element density, peripheral portion 294. Outside of the peripheral portion 294, the dot element density can be approximately uniform, or in some embodiments, dot element density can be a function of radial distance from the points 291.

In one embodiment, the dot element density is a maximum at the point 291 and decreases radially therefrom. Within a shell having an inner radius of r and an outer radius of r+dr centered on point 291, the dot elements 282 are disposed within the shell in an azimuthally random manner.

Frequently, the point light sources 250 do not emit a uniform distribution of light intensity. Therefore, in one embodiment, the light sources 250 are aligned with the openings 262 so as to allow light to pass therethrough, and the point light sources 250 is approximately aligned with the center portion 290 of the radially variable dot specific pattern 296. Then, the center portions 290 disposes on the diffuser 280 such that the center portions 290 are approximately aligned with regions where light intensity is at a local maximum. That is, the center portion 290 of the dot specific pattern 296 is defined for dominating the shield ratio, i.e. dominating the density of the dot elements 282, by a manner of varying the density of the dot elements 282 in radial direction and randomly distributing the dot elements 282 according azimuth.

Figure 8:
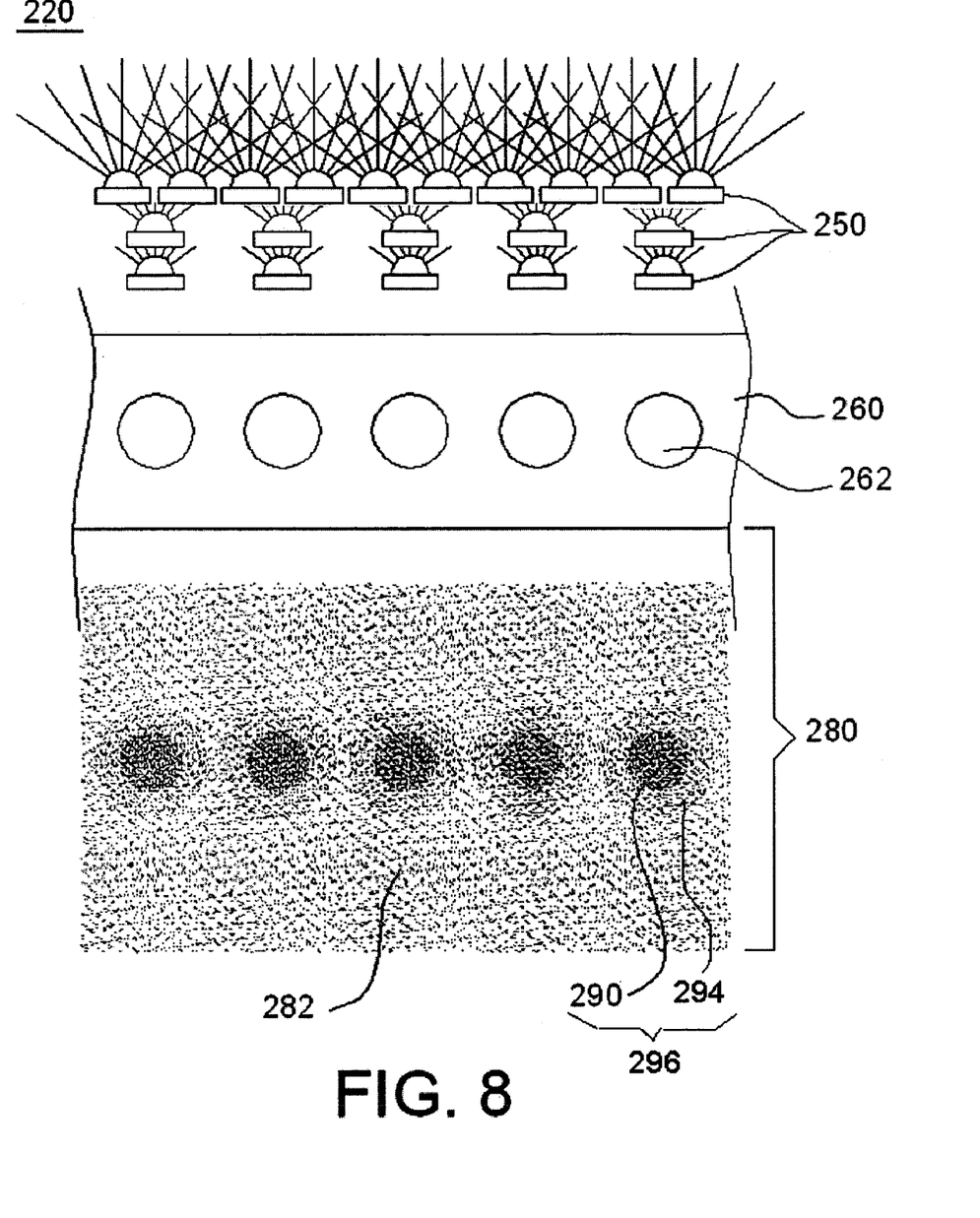
FIG. 8 shows a schematic view of a direct point-light type backlight module according to another embodiment of the present disclosure.

In the above embodiment, one point light source 250 is positioned in relation to one center portion 290 of the radially variable dot specific pattern 296. Alternatively, the present disclosure also can be applied to the structure that a plurality of point light source 250 are positioned in relation to one center portion 290 of the radially variable dot specific pattern 296 as shown in FIG. 8.

According to the direct point-light type backlight module 220, the plurality of point light sources 250 can be implemented by LEDs, mercury lamps or halogen lamps. In addition, in one embodiment, the plurality of dot elements 282 are disposed on the top surface of the diffuser 280. In another embodiment, the plurality of dot elements 282 are disposed on the lower surface of the diffuser 280. In yet another embodiment, some of the dot elements are disposed on the top surface and some are disposed on the lower surface of the diffuser 280.

The dot elements 282 can be of any predetermined or arbitrary shape. Non-limiting examples of the shape of the dot elements include convex dot, concave dot, or the combination of convex dot and concave dot. Further, the diffuser 280 can be made of transparent or half-transparent material, such as glass, acrylic resin, polymethyl methacrylate (PMMA), polycarbonate (PC), Arton, polyethylene terephthalate (PET) and so on; the dot elements 282 can be formed by or contain a reflective material, such as titanium (Ti) compound, silicon (Si) compound, BaSO4 and so on. In one embodiment, the dot elements 282 are formed on the diffuser 280 by screen printing technology or by molding the diffuser with desired dot specific patterns.

Figure 9A:
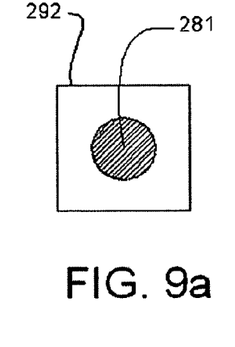
FIGS. 9(a) to 9(f) show different dot elements according to embodiments of the present disclosure.
Figure 9B:
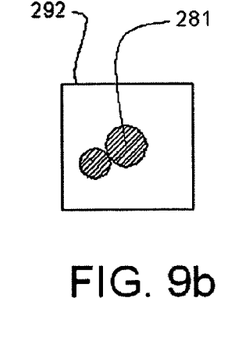
Figure 9C:
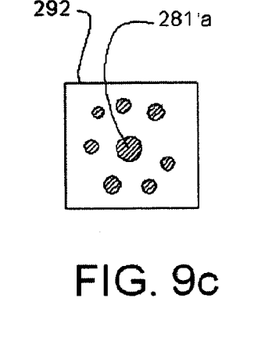
Figure 9D:
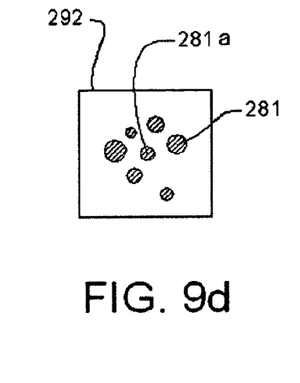
Figures 9E, 9F:
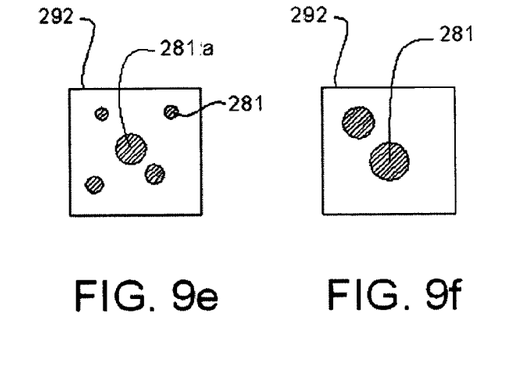

FIGS. 9(a) to 9(f) show different dot elements 282 according to embodiments of the present disclosure. The dot element 282 as shown in FIG. 9a contains a single point-like dot 281 within a predetermined unit area 292, e.g. a square area of 0.1 to 1.2 mm 2. The dot elements 282 as shown in FIGS. 9b and 9f respectively contain two point-like dot 281 within a predetermined unit area 292. The point-like dot 281 can be separate (FIG. 9b) or joined (FIG. 9f). As shown in FIGS. 9(c)–9(e), each dot element can also contain more than two point-like reflectors 281 within a predetermined unit area 292, wherein the point-like dot include a center point-like dot 281a and several peripheral point-like dot 281 distributed around the center point-like dot 281a.

In the above embodiment, the distribution of the dot elements 282 and the point-like dots 281 close to the center portion 290 of the dot specific pattern 296 is dense (a distance between the point-like dots 281 is shorter than the peripheral portion 294) or the diameter of point-like dots 281 close to the center portion 290 of the dot specific pattern 296 is large, and the distribution of the dot elements 282 and the point-like dots 281 far from the center portion 290 of the dot specific pattern 296 is sparse (a distance between the point-like dots 281 is longer than the peripheral portion 294) or the diameter of the point-like dots 281 far from the center portion 290 of the dot specific pattern 296 is small.

Figure 10A:
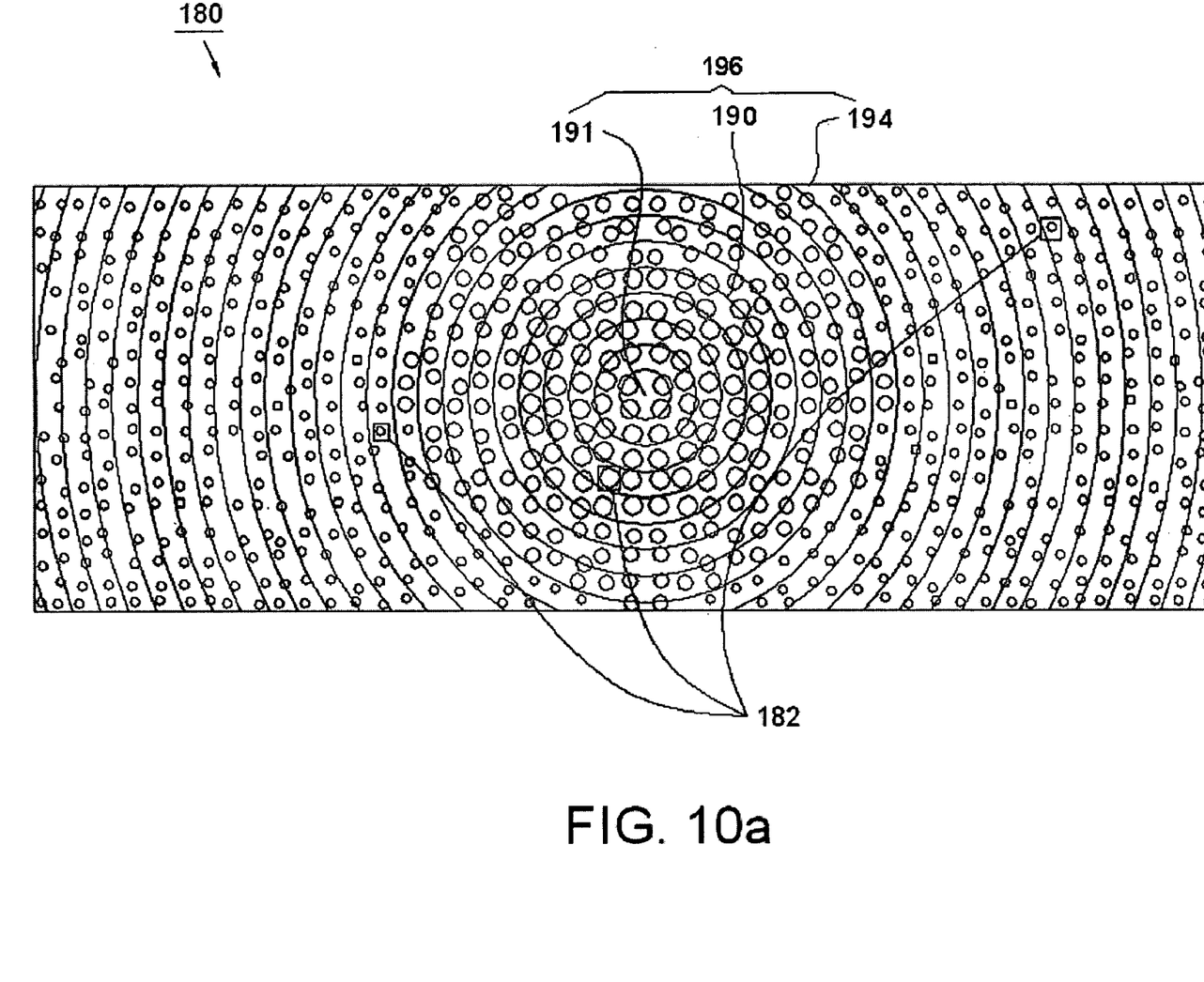
FIG. 10(a) shows a schematic view of the distribution of a radially variable dot specific pattern according to one embodiment of the present disclosure, wherein the dot element is presented in form of a single dot.
Figure 10B:
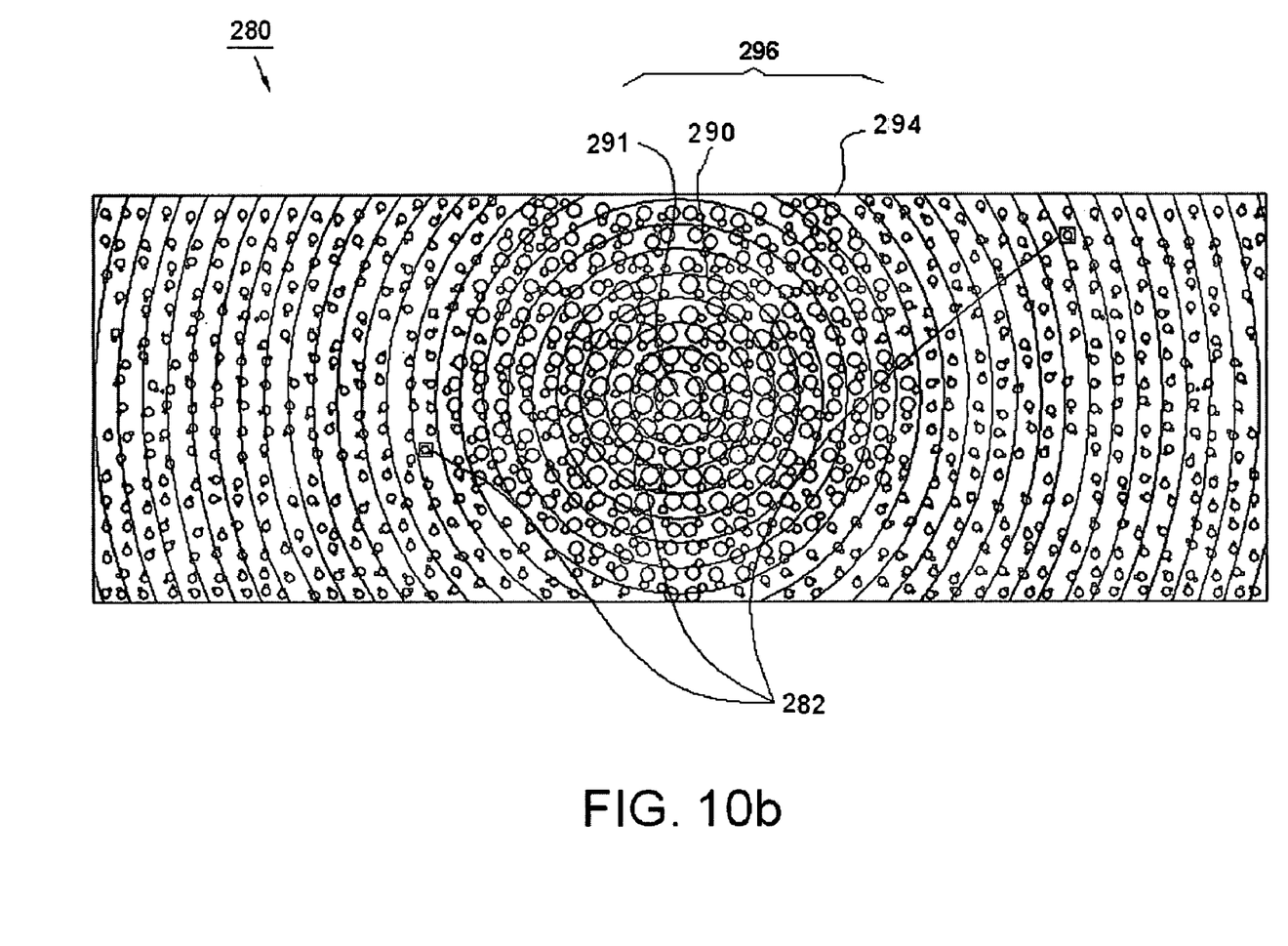
FIG. 10(b) shows a schematic view of the distribution of a radially variable dot specific pattern according to another embodiment of the present disclosure, wherein the dot element is presented in form of multiply dots.

It should be understood that a diffuser 180 may be presented in the form of a single point-like dot as shown in FIG. 10(a), the diffuser 180 having a plurality of dot elements 182 which are formed thereon and compose a radially variable dot specific pattern 196, the radially variable dot specific pattern 196 defines a center portion 190 and a peripheral portion 194. Point 191 are local centers about which a region of locally high dot element density, center portion 190, is disposed. Extending radially from the point 191, outside of the center portion 190, is a region of locally intermediate dot element density, peripheral portion 194. dot element density is a maximum at the point 191 and decreases radially therefrom. FIG. 10(b) shown the diffuser 280 having a plurality of dot elements 282 may be presented in the form of the multiple point-like dot or combination of the two single point-like dot. A diffuser 280 comprising the radially variable dot specific pattern 296 defines a center portion 290 and a peripheral portion 294. Point 291 are local centers about which a region of locally high dot element density and dot element density is a maximum at the point 191 and decreases radially therefrom. Furthermore, it should be understood that the shape of the point-like dots can be arbitrary or some other predetermined shape and that the use of circularly shaped point-like dots was merely for illustrative purposes.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A direct point-light type backlight module comprising:
a plurality of point light sources;
a reflector reflects lights that are supplied by the light sources; and
a diffuser having a plurality of dot elements which are formed thereon and compose a radially variable dot specific pattern, wherein the radially variable dot specific pattern defines a center portion thereof and at least one of the point light sources is approximately aligned with the center portion of the radially variable dot specific pattern.

2. The direct point-light type backlight module as claimed in claim 1, wherein the reflector having a plurality of openings respectively positioned in relation to the point light sources.

3. The direct point-light type backlight module as claimed in claim 1, wherein the point light source is selected from a group consisting of LED, mercury lamp and halogen lamp.

4. The direct point-light type backlight module as claimed in claim 1, wherein the dot element density is radially variable with a maximum proximal to a center point and decreases radially therefrom.

5. The direct point-light type backlight module as claimed in claim 1, wherein the diffuser has a top surface and a lower surface, and the dot elements are disposed on at least one surface of the diffuser.

6. The direct point-light type backlight module as claimed in claim 1, wherein at least one dot element has a given shape, the given shape selected from the set of shapes comprising convex and concave.

7. The direct point-light type backlight module as claimed in claim 1, wherein the diffuser is made using a material selected from a group consisting of glass, acrylic resin, polymethyl methacrylate (PMMA), polycarbonate (PC) and Arton, polyethylene terephthalate (PET).

8. The direct point-light type backlight module as claimed in claim 1, wherein the dot elements are formed using a reflective material selected from a group consisting of titanium (Ti) compound, silicon (Si) compound and BaSO4.

9. A method for manufacturing a direct point-light type backlight module, comprising following steps:
forming a plurality of point light sources;
forming a reflector reflects lights that are supplied by the light sources; and
forming a diffuser having a plurality of dot elements which are formed thereon and compose a plurality of radially variable dot specific patterns;
wherein each dot specific pattern defines a center portion thereof and at least one of the point light sources is aligned to the center portion of one of the radially random dot specific patterns.

10. The method as claimed in claim 9, wherein the reflector having a plurality of openings respectively positioned in relation to the point light sources.

11. The method as claimed in claim 9, wherein the point light source is selected from a group consisting of LED, mercury lamp and halogen lamp.

12. The method as claimed in claim 9, wherein for a given dot specific pattern, the distribution of the dot elements is a local maximum proximal to the center portion of the given dot specific pattern and diminishes radially therefrom.

13. The method as claimed in claim 9, wherein the diffuser has a top surface and a lower surface, and the dot elements are disposed at least one surface of the diffuser.

14. The method as claimed in claim 9, wherein the diffuser is made using a material selected from a group consisting of glass, acrylic resin, polymethyl methacrylate (PMMA), polycarbonate (PC) and Arton, polyethylene terephthalate (PET).

15. The method as claimed in claim 9, wherein the dot elements are formed by a reflective material selected from a group consisting of titanium (Ti) compound, silicon (Si) compound and BaSO4.

16. The method as claimed in claim 9, wherein the dot elements are formed on the diffuser by screen printing technology.

17. The method as claimed in claim 9, wherein the plurality of dot elements are formed on the diffuser by following steps:
molding the diffuser which has the dot specific patterns formed thereon; and
coating the diffuser with a reflective material, thereby forming the plurality of dot elements.

18. A liquid crystal display device comprising:
a liquid crystal panel having two substrates and a liquid crystal material sealed therebetween;
a backlight module disposed under the liquid crystal panel; and
a display case for housing the liquid crystal panel and the backlight module; wherein the backlight module is a direct point-light type and comprises:
a plurality of point light sources;
a reflector reflects lights that are supplied by the light sources; and
a diffuser having a plurality of dot elements which are formed thereon and compose a radially variable dot specific pattern;
wherein the radially random dot specific pattern defines a center portion thereof and at least one of the point light sources is corresponding to the center portion of the radially random dot specific pattern.

19. The liquid crystal display device as claimed in claim 18, wherein the reflector having a plurality of openings respectively positioned in relation to the point light sources.

20. The liquid crystal display device as claimed in claim 18, wherein the point light source is selected from a group consisting of LED, mercury lamp and halogen lamp.

21. The liquid crystal display device as claimed in claim 18, wherein the distribution of the dot elements is a local maximum proximal to the center portion of the at least one dot specific pattern and diminishes radially therefrom.

22. The liquid crystal display device as claimed in claim 18, wherein the diffuser has a top surface and a lower surface, and the dot elements are disposed on at least one surface of the diffuser.

23. A liquid crystal display device comprising:
a liquid crystal panel having two substrates and a liquid crystal material sealed therebetween;
a backlight module disposed under the liquid crystal panel; and
a display case for housing the liquid crystal panel and the backlight module;
wherein the backlight module is a direct point-light type and comprises:
a point light source that emits light; and
a diffuser that receives light directly from the light source, the diffuser having plurality of dot elements that define a first dot specific pattern centered upon a center point, the dot specific pattern has a local maximum dot element density proximal to the center point and the dot element density radially diminishes therefrom.

24. The liquid crystal display device of claim 23, wherein the dot elements are azimuthly randomly disposed in the dot specific pattern.

25. The liquid crystal display device of claim 23, wherein the light intensity from the light source is non-uniform such that a region of the diffuser directly receives local high intensity light from the light source, and the center point is approximately coincident with the region of the diffuser receiving high intensity light directly from the light source.

26. The liquid crystal display device of claim 23, further including:
a second point light source that emits light, wherein the plurality of dot elements defining a second dot specific pattern centered upon a second center point, the second dot specific pattern has a local maximum dot element density proximal to the second center point and the dot element density of the second dot specific pattern radially diminishes therefrom.

27. The liquid crystal display device of claim 26, wherein the first center point is aligned relative to the first point light source, and the second center point is aligned relative to the second point light source.

* * * * *